US007023319B2

(12) United States Patent
Hwang

(10) Patent No.: US 7,023,319 B2
(45) Date of Patent: Apr. 4, 2006

(54) DOOR LOCK HANDLE WITH FINGERPRINT RECOGNITION FUNCTION

(75) Inventor: Moon-Sung Hwang, Kwang Myung (KR)

(73) Assignee: Keico Hightech Inc., Seoul (KR)

( * ) Notice: Subject to any disclaimer, the term of this patent is extended or adjusted under 35 U.S.C. 154(b) by 250 days.

(21) Appl. No.: 10/476,057

(22) PCT Filed: May 15, 2002

(86) PCT No.: PCT/KR02/00907

§ 371 (c)(1), (2), (4) Date: Oct. 27, 2003

(87) PCT Pub. No.: WO02/095170

PCT Pub. Date: Nov. 28, 2002

(65) Prior Publication Data

US 2004/0164845 A1 Aug. 26, 2004

(30) Foreign Application Priority Data

May 19, 2001 (KR) ...................... 2001-0014706 U

(51) Int. Cl.
*G05B 19/00* (2006.01)

(52) U.S. Cl. ........................ 340/5.53; 341/20; 341/34; 70/277

(58) Field of Classification Search ............... 340/5.53; 341/20, 34; 70/277, 278.1
See application file for complete search history.

(56) References Cited

U.S. PATENT DOCUMENTS

| | | | | |
|---|---|---|---|---|
| 5,844,470 | A * | 12/1998 | Garnault et al. | 340/5.62 |
| 6,429,782 | B1 * | 8/2002 | Pavatich et al. | 340/686.6 |

FOREIGN PATENT DOCUMENTS

| | | |
|---|---|---|
| JP | 01-235783 | 9/1989 |
| JP | 08-028109 | 1/1996 |
| KR | 20-0217982 | 1/2001 |

* cited by examiner

*Primary Examiner*—Michael Horabik
*Assistant Examiner*—M. Shimizu
(74) *Attorney, Agent, or Firm*—Robert E. Bushnell, Esq.

(57) ABSTRACT

A door lock handle. The door lock handle having a fingerprint recognition module comprises a handle body having an installing groove with a designated size so as to installing the fingerprint recognition module, a handle cover having an exposing groove corresponding to the installing groove so as to expose a fingerprint recognition plate of the fingerprint recognition module installed on the handle body, a switch hole formed by perforating a part of the handle body, and a protruded conductor installed on the switch hole, the conductor serving to sense the grip of the door lock handle of the user. Herein, the conductor is electrically connected to a touch switch circuit mounted on a door lock controlling unit, and the touch switch circuit senses the grip of the door lock handle by the user and provides the sensed signal to the door lock controlling unit.

4 Claims, 4 Drawing Sheets

DOOR LOCK HANDLE WITH FINGERPRINT RECOGNITION FUNCTION

CLAIM OF PRIORITY

This application makes reference to, incorporates the same herein, and claims all benefits accruing under 35 U.S.C. §§ 119, 120, and § 365 from my application DOOR LOCK HANDLE WITH FINGERPRINT RECOGNITION FUNCTION filed with the Korean Industrial Property Office o 19 May 2001 and there duly assigned Serial No. 2001-14706, and my International Application entitled DOOR LOCK HANDLE WITH FINGERPRINT RECOGNITION FUNCTION filed on 15 May 2002 and duly assigned Serial No. PCT/KR02/00907.

TECHNICAL FIELD

The present invention relates to a door lock handle installed on a door used in a residential building such as a general house or an apartment, or a business building, or other various doors of a car or a safe, and more particularly, to a door lock handle comprising a fingerprint recognition module.

BACKGROUND ART

In General fingerprint recognition door locks, a specific user's fingerprint data are inputted and stored as reference data on a memory. After then, the user's finger contacts an area for recognizing a fingerprint recognition module. Thus, the user's fingerprint is recognized. If the user's fingerprint is identified with the reference data stored in the memory, the locking of the door lock is opened. The fingerprint recognition module is applied to locking devices of various doors by using the aforementioned function.

However, in case of a hand door, since the fingerprint recognition module is separated form the door lock handle, in order to open the door, after the user is identified by recognizing his/her fingerprint by the fingerprint recognition module, the door lock handle must be rotated, thereby opening the door. Further, in order to operate the fingerprint recognition module, the power is supplied to the fingerprint recognition module by pressing the start button. Then, the fingerprint of the user is recognized by contacting the fingerprint recognition module. Thereby, this process of the conventional case results in user's troublesomeness.

DISCLOSURE OF THE INVENTION

Therefore, in view of the above problems, an object of the present invention is to provide a power-saving door lock system, in which a fingerprint recognition module is formed on a door lock handle, and the power is supplied only by touching a conductor of the door lock handle by an user, thereby driving the fingerprint recognition module.

In accordance with a preferred embodiment of the present invention, the above and other objects can be accomplished by the provision of a door lock handle having a fingerprint recognition module, recognizing a user's fingerprint by the fingerprint recognition modules, and providing the recognized fingerprint data to a door lock controlling unit, and comprising a handle body having an installing groove with a designated size so as to installing the fingerprint recognition module, a handle cover having an exposing groove corresponding to the installing groove so as to expose a fingerprint recognition plate of the fingerprint recognition module installed on the handle body, a switch hole formed by perforating a part of the handle body, and a protruded conductor installed on the switch hole, the conductor serving to sense the grip of the door lock handle of the user. Herein, the conductor is electrically connected to a touch switch circuit mounted on the door lock controlling unit, and the touch switch circuit senses the grip of the door lock handle by the user and provides the sensed signal to the door lock controlling unit.

Preferably, the door lock handle further may comprise an insulator installed between the handle body and the conductor so as to electrically insulate the conductor from the door lock handle body.

The installing groove of the handle body is formed so that the fingerprint recognition module inserted into the installing groove is perpendicular to the door.

The door lock-controlling unit responds the sensed signal provided by the touch switch circuit and drives the fingerprint recognition module.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, with reference to FIGS. 1 to 4, a preferred embodiment of the present invention is described in derail.

Figure 1:
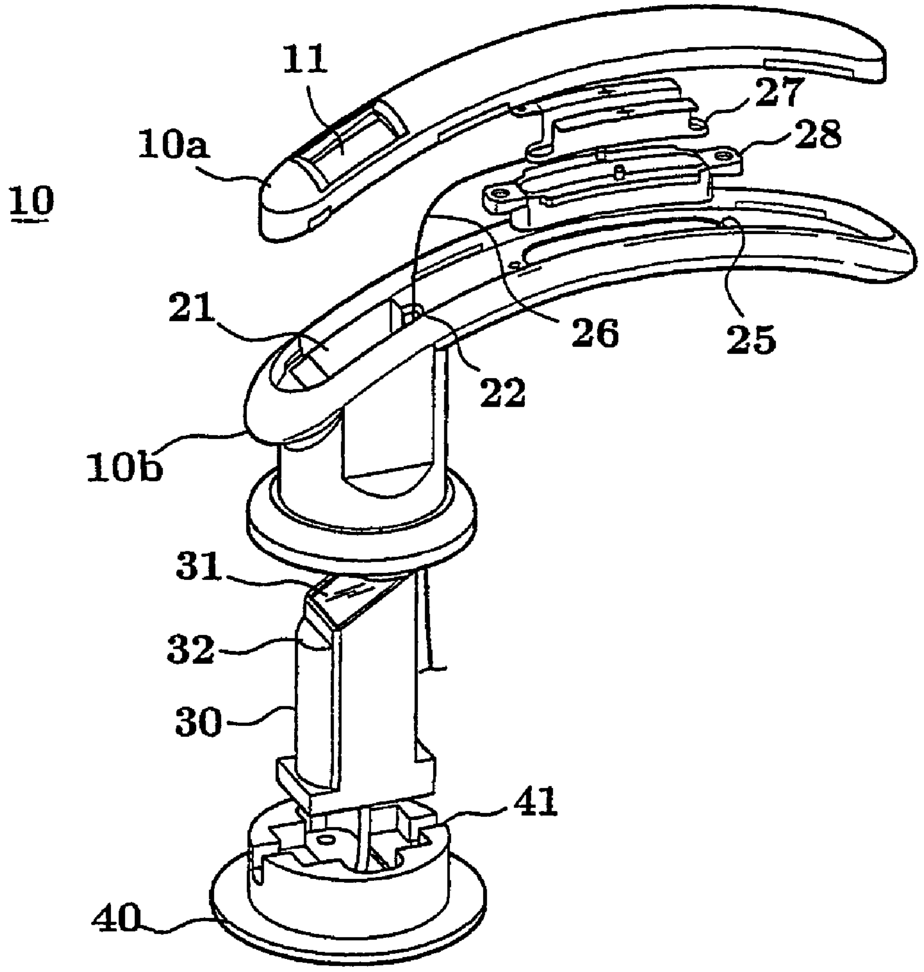
FIG. 1 is an exploded perspective view of a door lock handle in accordance with the present invention.
Figure 2:
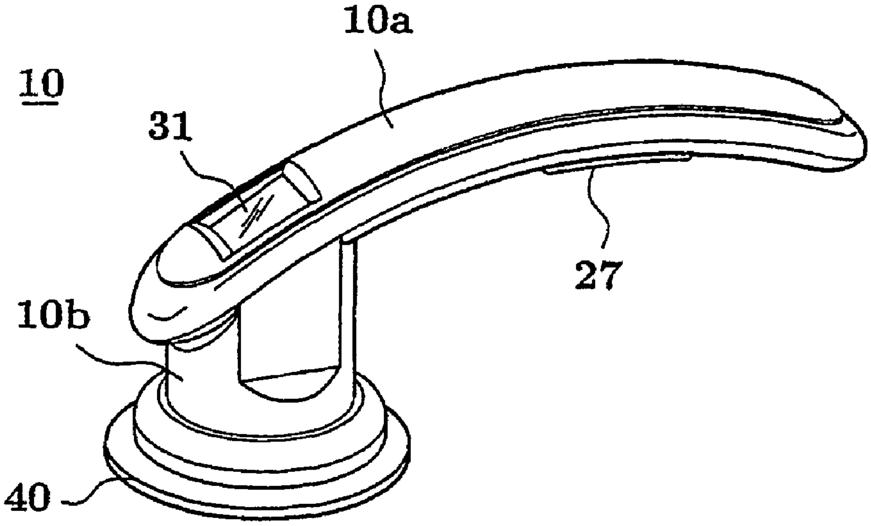
FIG. 2 is a combined perspective view of the door lock handle in accordance with the present invention.

As shown in FIGS. 1 and 2, a handle 10 comprises a handle cover 10*a* and a handle body 10*b*. The handle body 10*b* is coupled with a supporting member 40 combined with a door, thereby releasing the locking of the door by rotating the handle by a user.

The handle cover 10*a* is made of conductive material. An exposing groove 11 with a square shape is formed on the upper surface of the handle cover 10*a*. Since the exposing groove 11 is formed on a handle member, the exposing groove 11 is curved along the cylindrical surface of the handle member. A groove for mounting a fingerprint recognition module 30 and a groove for mounting a touch switch are formed on the handle body 10*b*. An installing groove 21 formed on the handle body 10*b* has a designated size and depth so that a fingerprint recognition module member 30. The fingerprint recognition module 30 of the present invention is inserted into the installing groove 21, and reached to the exposing groove 11 of the handle cover 10*a*. Then, the door and the fingerprint recognition module 30 are perpendicular to each other. Herein, a fingerprint recognition plate 31 installed on the fingerprint recognition module 30 naturally turns toward the user. Therefore, a motion of grapping the handle 10 by the user and a motion of mounting the user's finger on the fingerprint recognition plate 31 can be naturally interconnected.

In order to prevent the fingerprint recognition module 30 from seceding from the installing groove 21, a protrusion 32 is formed on the fingerprint recognition module 30. The protrusion 32 serves to prevent the recognition module 30 from not being inserted more than a designated depth.

One end of the fingerprint recognition module 30 is combined with the supporting member 40. Electric wire of the fingerprint recognition module 30 passes through the supporting member 40 without bending by an electric wire hole 41 formed on the supporting member 40.

A through hole 22 with a designated size is formed on the handle body 10*b*, thereby passing transmitting wires 26 of a conductor 27 of a touch switch circuit 29. An insulator 28 of the touch switch circuit is combined with the bottom surface of the handle 10 so that the insulator 28 protrudes via a switch hole 25 formed by perforating the center of the handle body 10*b*. As the user grips the handle, the user naturally touches the conductor 27, thereby generating a signal and recognizing the user's fingerprint. Simultaneously, the power is supplied or blocked.

Figure 3:
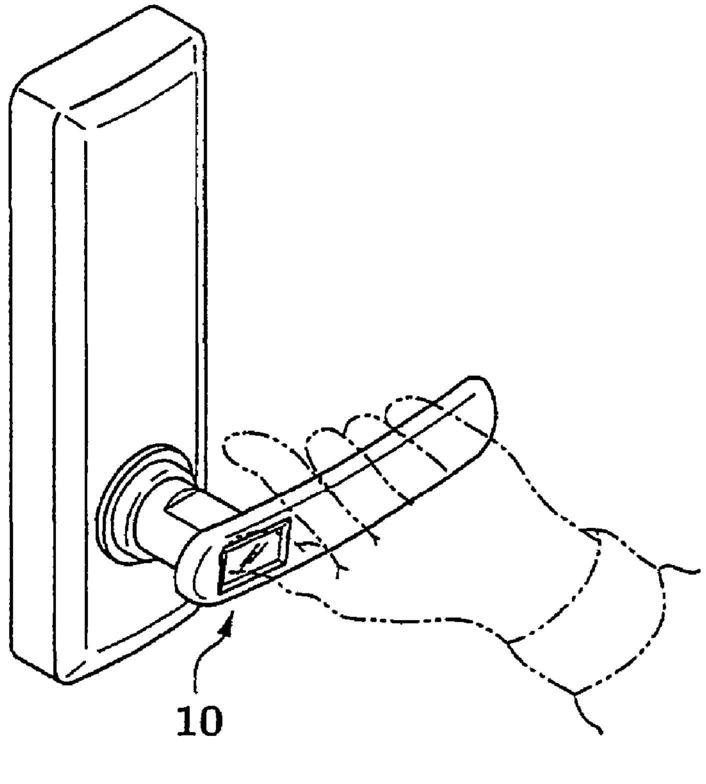
FIG. 3 is a perspective view of a preferred embodiment of a door lock device employing the door lock handle of the present invention.

Therefore, as shown in FIG. 3, in order to detect the fingerprint, if the finger with the registered fingerprint is mounted on the fingerprint recognition plate 31 of the fingerprint recognition module 30 and grips the conductor 27 formed on the bottom surface of the handle 10, the power is supplied to the fingerprint recognition module 30, thereby performing the fingerprint recognition. Herein, the conductor 27 is formed on the bottom surface of the handle 10. However, the location of the conductor 27 may be variously modified.

Figure 4:
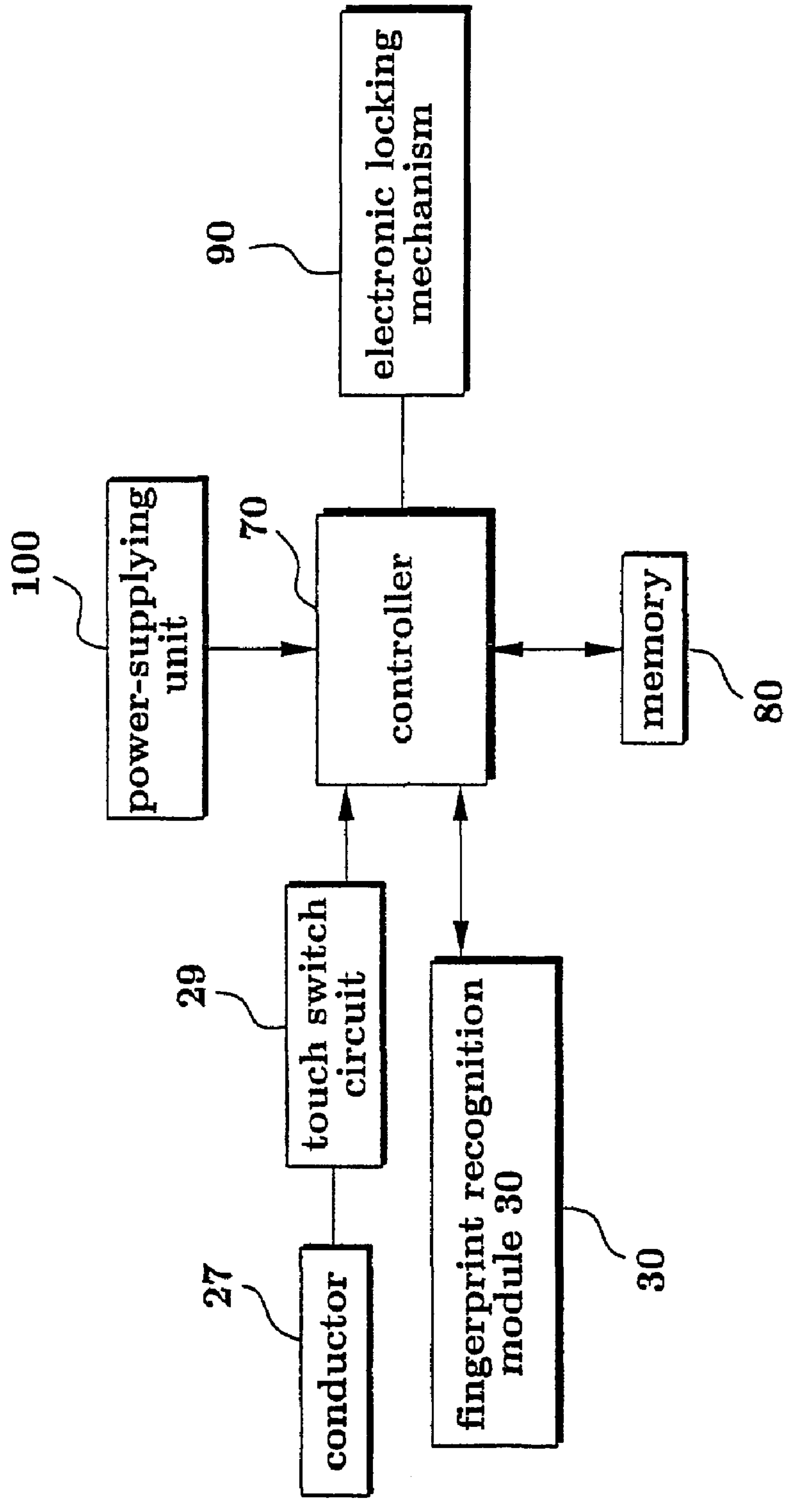
FIG. 4 is a schematic view illustrating the preferred embodiment of the door lock device employing the door lock handle of the present invention.

Hereinafter, with reference to FIG. 4, a data processing of a controlling unit of the fingerprint recognition door lock handle of the present invention is described in detail. As shown in FIG. 3, when the hand of the user contacts the conductor 27 of the switch circuit 29, the conductor 27 generates a signal by the conduction and the manipulation of the touch switch circuit 29. The generated signal is inputted to a controller 70. The controller 70 drives the fingerprint recognition module 30 according to a predetermined manner. The fingerprint recognition module 30 comprising an optical fingerprint recognition sensor receives a designated power by the manipulation of the controller 70. Thereby, a back right (not shown) generates a designated light.

Incident lights reflected by a ridge and a valley of a surface of the user's finger are changed into electric data by a photoelectric converter (not shown), and the changed data are again transmitted to the controller 70.

The controller 70 compares the inputted data with the fingerprint data of the licensee stored on the memory 80. If the inputted date are identified with the stored data, the door is opened.

The electronic locking mechanism 90 is driven to release the locking of the door lock according to the outputted controlling signal and allows the user to rotate the handle 10. The aforementioned power-supplying unit 100 serves to supply the power for operating the fingerprint recognition door lock handle of the present invention.

As described above, in the door lock handle of the present invention, the user having the registered fingerprint grips the handle 10 and contacts his/her finger on the fingerprint recognition plate 31 of the fingerprint recognition module 30. Then, the fingerprint of the user is recognized by the fingerprint recognition module 30, thereby being capable of opening the door by rotating the handle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

Accordingly, as described above, the present invention provides the door lock handle comprising the fingerprint recognition module, thereby detecting the fingerprint of the user at a contacting area of the user's thumb. Thereby, the present invention provides the same function as the opening of the conventional door by griping and rotating the handle. Particularly, the supply of the power/the block of the power can be performed at a moment of requiring the fingerprint recognition using the touch switch, thereby obtaining the power saving. Further, if the door lock handle of present invention is applied at an area for requiring security or to a door of an article requiring security, the door is more easily and conveniently opened. Simultaneously, the security of the door is effectively assured.

What is claimed is:

1. A door lock handle having a fingerprint recognition module, recognizing a user's fingerprint by the fingerprint recognition module, and providing the recognized fingerprint data to a door lock controlling unit, said door lock handle comprising:

a handle body having an installing groove with a designated size so as to install the fingerprint recognition module;

a handle cover having an exposing groove corresponding to the installing groove so as to expose a fingerprint recognition plate of the fingerprint recognition module installed on the handle body;

a switch hole formed by perforating a part of the handle body; and a protruded conductor installed on the switch hole, the conductor serving to sense the grip of the door lock handle of the user, wherein said conductor is electrically connected to a touch switch circuit mounted on the door lock controlling unit, and the touch switch circuit senses the grip of the door lock handle by the user and provides the sensed signal to the door lock controlling unit.

2. The door lock handle as set forth in claim 1, further comprising an insulator installed between the handle body and the conductor so as to electrically insulate the conductor from the door lock handle body.

3. The door lock handle as set forth in claim 1, wherein said installing groove of the handle body is formed so that the fingerprint recognition module inserted into the installing groove is perpendicular to the door.

4. The door lock handle as set forth in claim 1, wherein said door lock controlling unit responds the sensed signal provided by the touch switch circuit and drives the fingerprint recognition module.

* * * * *